United States Patent
Sandgren et al.

(10) Patent No.: US 10,893,493 B2
(45) Date of Patent: Jan. 12, 2021

(54) RADIO COMMUNICATION USING A TIME DIVISION DUPLEX STRUCTURE

(71) Applicant: Telefonaktiebolaget LM Ericsson (publ), Stockholm (SE)

(72) Inventors: Magnus Sandgren, Staffanstorp (SE); Robert Baldemair, Solna (SE); Anders Höglund, Hägersten (SE); Mårten Wahlström, Hägersten (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/475,986

(22) PCT Filed: Jan. 16, 2017

(86) PCT No.: PCT/SE2017/050036
§ 371 (c)(1),
(2) Date: Jul. 3, 2019

(87) PCT Pub. No.: WO2018/132046
PCT Pub. Date: Jul. 19, 2018

(65) Prior Publication Data
US 2019/0357157 A1 Nov. 21, 2019

(51) Int. Cl.
*H04W 56/00* (2009.01)
*H04L 5/14* (2006.01)
*H04W 72/04* (2009.01)

(52) U.S. Cl.
CPC ......... *H04W 56/001* (2013.01); *H04L 5/1469* (2013.01); *H04W 72/0446* (2013.01)

(58) Field of Classification Search
CPC . H04B 7/2656; H04B 7/2693; H04L 27/2607; H04L 27/2662; H04L 27/2666;
(Continued)

(56) References Cited

U.S. PATENT DOCUMENTS

2008/0080448 A1 4/2008 Rottinghaus
2011/0188414 A1 8/2011 Dai et al.
(Continued)

FOREIGN PATENT DOCUMENTS

EP 151190 A1 2/2005
EP 1833178 A1 9/2007

OTHER PUBLICATIONS

International Search Report and Written Opinion dated Oct. 9, 2017 for International Application No. PCT/SE2017/050036 filed on Jan. 16, 2017, consisting of 12-pages.
(Continued)

*Primary Examiner* — Pao Sinkantarakorn
(74) *Attorney, Agent, or Firm* — Christopher & Weisberg, P.A.

(57) ABSTRACT

In a radio communications network using a TDD structure to communicate with UE terminals, a radio network node applies such a TDD structure that at least one guard period is included in each slot between a downlink transmission period containing at least one downlink symbol and an uplink reception period containing at least one uplink symbol. Each guard period represents an interval during which the radio network node does not transmit any data. The radio network node allocates the guard periods dynamically by checking whether at synchronization degradation criterion is fulfilled; and if at least one of the at least one synchronization degradation criterion is fulfilled, the radio network node increases the guard period to have an extended duration relative to a previous duration.

24 Claims, 4 Drawing Sheets

(58) Field of Classification Search
CPC ............ H04L 27/2678; H04W 52/001; H04W 52/0015
See application file for complete search history.

(56) References Cited

U.S. PATENT DOCUMENTS

2015/0043392 A1   2/2015   Susitaival et al.
2015/0181612 A1   6/2015   Gan et al.

OTHER PUBLICATIONS

3GPP TS 36.133 V14.0.0; 3rd Generation Partnership Project; Technical Specification Group Radio Access Network; Evolved Universal Terrestrial Radio Access (E-UTRA); Requirements for support of radio resource management (Release 14) Jun. 2016, consisting of 2046-pages.

3GPP TS 36.211 V14.0.0; 3rd Generation Partnership Project; Technical Specification Group Radio Access Network; Evolved Universal Terrestrial Radio Access (E-UTRA); Physical channels and modulation (Release 14) Sep. 2016, consisting of 170-pages.

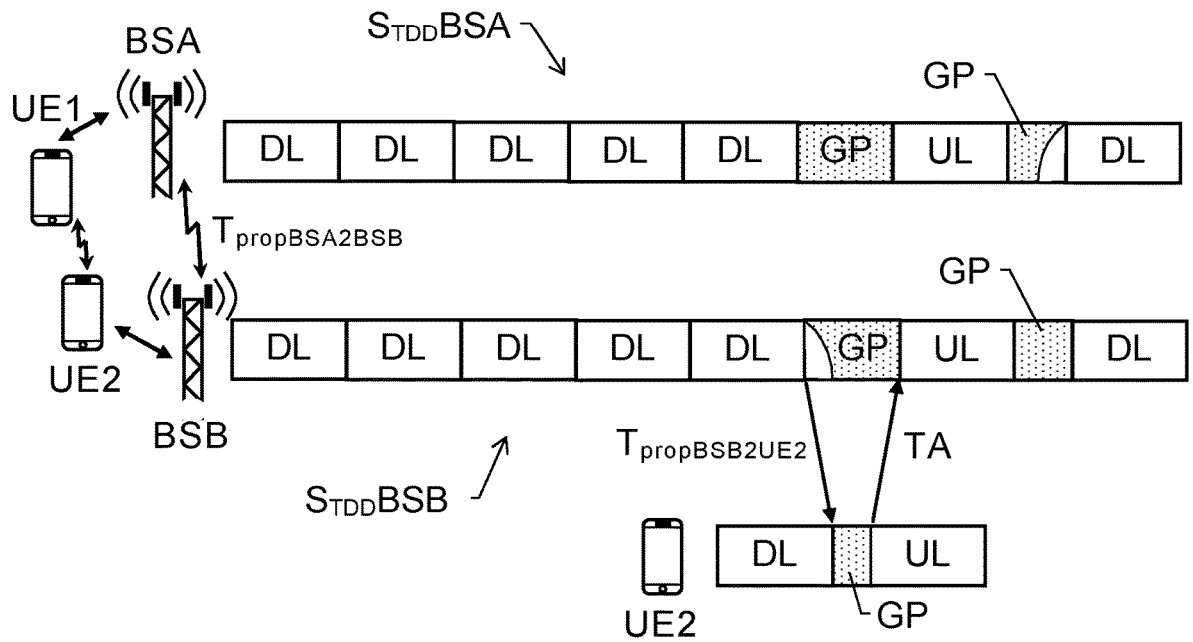
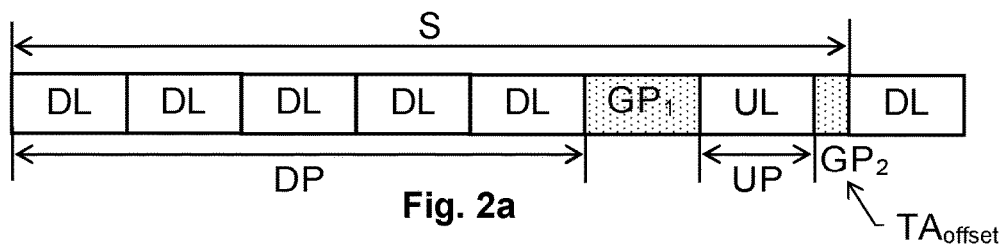
Fig. 2a
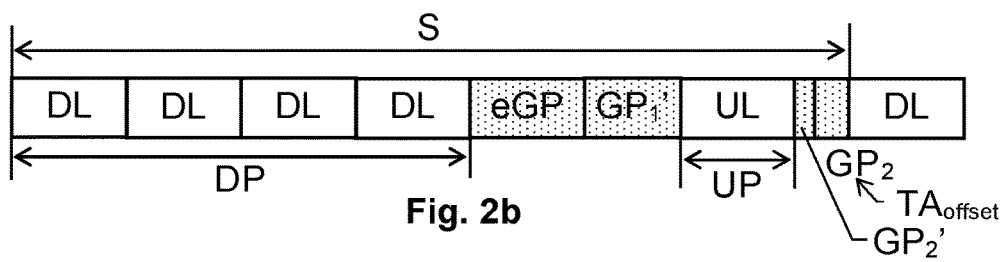
Fig. 2b
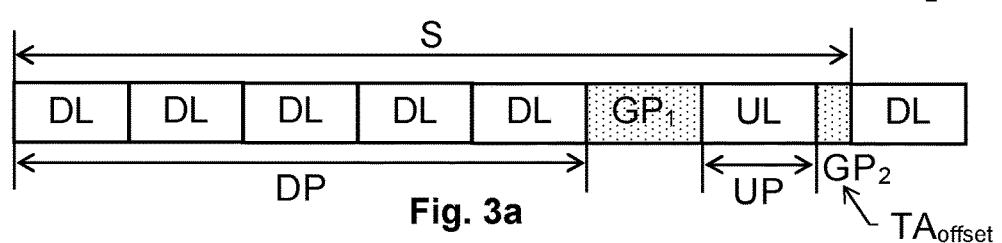
Fig. 3a
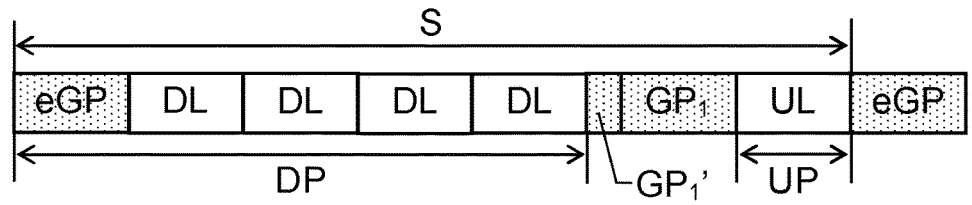
Fig. 3b

RADIO COMMUNICATION USING A TIME DIVISION DUPLEX STRUCTURE

CROSS-REFERENCE TO RELATED APPLICATIONS

This application is a Submission Under 35 U.S.C. § 371 for U.S. National Stage Patent Application of International Application Number: PCT/SE2017/050036, filed Jan. 16, 2017 entitled "RADIO NETWORK NODE AND METHOD FOR A RADIO NETWORK NODE," the entirety of which is incorporated herein by reference.

TECHNICAL FIELD

The invention relates to a radio network node for use in a radio communications network using a time division duplex (TDD) structure to communication with user equipments and a method implemented in a radio network node. The invention also relates to a computer program and a non-volatile data carrier.

BACKGROUND

In a cellular communications system like Long-Term Evolution (LTE) TDD, in order to avoid critical interference between neighboring base stations and between user terminals belonging to these base station, the base stations are synchronized in time and neighboring base stations transmit downlink data simultaneously to their respective user terminals and receive uplink data simultaneously from these user terminals. Consequently, this applies also to user terminals connected to these base stations, i.e. they all receive downlink data simultaneously and transmit uplink data simultaneously to their respective base station.

However, even if considerable efforts are made to synchronize the base stations in time, synchronization errors will always exist to some extent, inter alia due to synchronization limitations in the hardware. For example, according to the specifications 3GPP TS 36.133 a maximum absolute deviation in frame start timing between any pair of cells on the same frequency that have overlapping coverage areas is 3 µs for cells with a radius of less than 3 km and 10 µs for cells being larger than or equal to 3 km in radius.

In most practical implementations, this requirement is divided down to each base station as a 1.5 µs margin in relation to a common timing reference, for instance international atomic time (TAI).

A TDD system cannot receive and transmit signals at the same time. Therefore, the base stations in such a system switches between transmitting downlink data and receiving uplink data according to a predefined pattern and with a predefined periodicity. For example today's LTE TDD standard provides seven different configuration options of such patterns to offer a configurable number of symbols for downlink data and uplink data respectively. A special sub frame is included in each pattern where switching from downlink to uplink occurs.

For the uplink-to-downlink switch a guard period (GP) must also be assigned. This is effected by applying a fixed offset and timing advance in the base station. In addition to that, the user equipment must also apply a variable timing advance to the uplink transmission in order to compensate for the propagation time between the user equipment's current position and the base station.

A point in time when a synchronization error between the base stations may become critical is around the uplink/downlink switching. Namely, here, there is a risk of one base station is transmitting in the downlink (DL) while another base station is receiving in the uplink (UL), and interference may occur. Of course, the analogous is true also for user equipments connected to the base stations.

To avoid such interference, the guard periods between the DL-to-UL switching points and the UL-to-DL switching points must establish a time margin that includes margin for the maximal allowed synchronization error in the system.

In 3GPP NR (Third Generation Partnership Project, New Radio), the aim is to decrease the overall latency. For the radio link, this means reducing the switching periodicity compared to today's LTE. More frequent switching means larger overhead and less efficient spectrum utilization. Therefore, even if a larger GP would allow for larger synchronization errors, it is desirable to keep the GP at a minimum.

A base station can receive its timing from different synchronization sources. A global navigation satellite system (GNSS) receiver is one commonly used example of a synchronization source. Nevertheless, a strict synchronization requirement can be very costly to meet, especially in environments where no clear view of sky is available. Namely, in such a case, the installation cost may become substantial to fulfill the synchronization requirement. Since timing information degrades with increasing distance to the timing source, all base station sites cannot have the same pre-requisite to achieve cost efficient synchronization solutions.

The maximum allowed timing error for a base station is specified at the antenna reference point (ARP). Here, the synchronization input error is only one part of the total timing budget, which also includes internal errors and a so-called holdover margin.

If the synchronization source for some reason (e.g. due to jamming or hardware malfunction) cannot provide a base station with time synchronization, the base station enters a holdover mode. During the holdover mode, an internal oscillator in the base station maintains the timing in the base station. The holdover duration, i.e. the period during which the base station can remain operational before the maximum allowed synchronization error is reached depends of a combination of holdover margin allocated and the frequency stability of the internal oscillator in the base station.

Different clock sources, or oscillators, have different levels of frequency stability. In general, increased frequency stability comes at an increased cost; and above a certain level of stability, it cannot be commercially justified to improve the stability further. Moreover, highly stabile clock sources, for instance oven controlled crystal oscillators (OCXOs) may consume significant amounts of power, and/or require long start up times. Consequently, some degree of synchronization errors must be tolerated in the base stations.

In 5G (fifth generation mobile networks/wireless systems) and NR there will be different number of symbols in a so-called slot. A slot may contain either 7 or 14 symbols. The duration of a symbol further depends of the supported sub carrier spacing (SCS). For 15 kHz SCS, the duration of a symbol is approximately 71 µs, i.e. the same as in LTE. The symbol duration decreases to half for each doubling of the SCS.

Referring now to FIG. 1, we will illustrate one example of interference in a TDD system including a first radio network node BSA, e.g. implementing a base station BSA, neighboring a second radio network node BSB, e.g. likewise implementing a base station. In this example, we assume that a TDD structure $S_{TDD}BSB$ maintained by the second base station BSB is somewhat late relative to a TDD structure $S_{TDD}BSA$ maintained by the first radio network node BSA.

As a result, base station-to-base station interference may occur. Namely, when switching from DL to UL, the "late" DL transmission from the second radio network node BSB risk interfering with the first radio network node's BSA UL reception. Moreover, when switching from UL to DL, the relatively "early" DL transmission from the first radio network node BSA risk interfering with the second radio network node's BSB UL reception, which may still be in progress.

Additionally, UEs connected to the first and second radio network nodes BSA and BSB may cause interference to one another. For example, let us assume that a first UE UE1 is connected to the first radio network node BSA and a second UE UE2 is connected to the second radio network node BSB. Then, when switching from DL to UL, the first UE's UE1 relatively "early" UL transmission risk interfering with the DL reception in the second user equipment UE2 that may still be in progress. Conversely, when switching from UL to DL, the "late" UL transmission from the second user equipment UE2 risk interfering with the DL reception in the first user equipment's UE1.

In FIG. 1, a propagation delay between the first and second radio network nodes BSA and BSB is denoted $T_{propBSA2BSB}$, and a parameter $T_{propBSB2UE2}$ reflects a propagation delay from the second radio network node BSB to the second UE UE2. Due to the propagation delay $T_{propBSB2UE2}$ and a timing advance TA (i.e. an earlier point in time at which the second user equipment UE2 must initiate its UL transmission to reach the second radio network node BSB in time), the guard period GP becomes shorter at the second user equipment UE2 than at the second radio network node BSB Naturally, to avoid severe interference problems, in addition to being synchronized in time (phase), the same switching periodicity and DL-UL configurations must be applied in any neighboring cellular system whose cells are not interference isolated from one another.

US 2011/0188414 A1 describes a signal transmission method in a TDD system. The method contains following steps: within a time length of a half-frame of a radio frame, base station transmits signal on a downlink special time slot, thereafter does not transmit signal on a guard period, and then receives signal on an uplink special time slot; all time lengths of other uplink or downlink normal time slots for transmitting signal are equal; the total time length of the downlink special time slot, the guard period and the uplink special time slot is integer times of the time length of an uplink or downlink normal time slot. In addition, a frame structure adopted in the TDD system which corresponds to the method is disclosed. The present invention makes it flexible to set the duration of the guard period and it is guaranteed that, even if a synchronization signal adopts power promotion, it will not bring great interference to uplink reception of other base stations; in addition, the utilization efficiency of the system is improved.

US 2015/0043392 A1 discloses a solution for providing the ability for a subframe to be dynamically configured in TDD communications between a UE radio terminal and a radio network node. A frame structure includes one or more subframes preconfigured as a downlink subframe, one or more subframes preconfigured as an uplink subframe, and one or more dynamically configurable subframes. Each dynamically configurable subframe includes a guard time period and at least a downlink part for transporting a dynamically configurable amount of downlink information, and in some embodiments, uplink information. A configuration for dynamically configurable subframes is determined for transmission and/or reception between the UE radio terminal and the radio network node.

Consequently, solutions are known for establishing dynamically configurable TDD communication. However, problems still remain to be solved.

For example, in LTE TDD, the time synchronization requirement is fixed, except for the different cell size ranges (i.e. a radius smaller than 3 km and larger than or equal to 3 km, respectively).

Theoretically, in larger cells, an even larger portion could be allocated for the propagation delays in the DL-UL part of the guard period GP. However, since the $TA_{offset}$ part is fixed, this is not possible.

As mentioned above, different base stations and radio network node sites may have different capabilities to retrieve accurate synchronization to a reasonable/acceptable cost.

Further, depending on the services supported by the radio network node, the amount of guard period overhead may vary considerably, for example whether or not very low latency services are supported. This means that while some radio network nodes can accept particular amount of overhead, other radio network nodes cannot accept this amount of overhead.

In addition, in today's LTE TDD, a relatively large portion of the timing budget is allocated for holdover in order to meet the fixed timing requirements.

To implement coordinated functions and services, it is generally necessary that either two base station transmissions to arrive sufficiently close in time at the user terminal, or that transmissions from the user terminal arrive sufficiently close in time at two different base stations. Since the differences in propagation delay typically constitutes a relatively large part of the total budget timing budget, and the propagation delay depends user terminal's position, there is no fixed limit of the maximum allowed synchronization error.

In LTE, the DL-to-UL switching is effected during special subframes. After the UL-to-DL switch, a regular DL subframes follows. The guard time GP is determined via a large enough timing advance TA, so that it is ensured that the UL transmission ends early enough in a previous subframe. However, LTE does not provide any mechanism for starting a DL transmission late in a subframe.

In LTE, the TDD configuration, and thus the configuration of the special subframe, is broadcasted in the so-called Master Information Block. This only allows for very slow changes of the parameters. Accordingly, improved technical solutions are needed.

SUMMARY

An object of the present invention is therefore to mitigate the above problems and offer improved flexibility and efficiency in a radio communications network using a TDD structure.

According to one aspect of the invention, this object is achieved by a radio network node for use in a radio communications network using a TDD structure to communicate with user equipments, UEs. The radio network node includes a radio interface configured to receive data from the UEs, and transmit data to the UEs. The radio network node also includes a processor and a memory. The memory, in turn, contains instructions executable by the processor, whereby the radio network node is operative to, apply a TDD structure, which, in each slot, contains at least one guard period between a downlink transmission period and an uplink reception period. The downlink transmission period contains at least one downlink symbol in which the radio network node may transmit data to a UE. The uplink reception period contains at least one uplink symbol in which the radio network node may receive data from the UE. The instructions executable by the processor are also configured to render the radio network node operative to check whether at least one synchronization degradation criterion is fulfilled; and if so, the radio network node increases the guard period to have an extended duration relative to a previous duration. This may involve extending the guard period from a regular duration, as well as extending an already extended guard period even further.

The proposed radio network node is advantageous because it allows a flexible tradeoff between synchronization accuracy and guard period overhead.

Especially for radio network nodes where the additional guard period overhead is not significant (e.g. due to less frequent transmitting-receiving switching), or where the guard period overhead is not a key optimization parameter, the proposed possibility to relax the synchronization accuracy allows for more cost-efficient options for the synchronization. In other words, the production and/or the installation costs can be reduced The flexibility to dynamically change the guard period allocation enables reliable and continuous operation even if the synchronization performance temporarily degrades, or is lost. This prolongs the radio network node's operation, so that for example a base station can operate longer than over the standard holdover durations. Naturally such a capability increase the availability of the radio network node, which is a key requirement in NR.

According to one embodiment of this aspect of the invention, the at least one synchronization degradation criterion is fulfilled if: (i) the radio network node does not receive a timing signal from a specified synchronization source, (ii) the radio network node receives the timing signal from the specified synchronization source with a quality below a threshold value, (iii) the radio network node experiences interference above a threshold level, or (iv) the radio network node receives an interference report from a UE, which interference report indicates an experienced interference above the threshold level. Thus, the extended guard period can be applied dynamically when needed.

According to another embodiment of this aspect of the invention, the uplink reception period contains a single uplink symbol, and the downlink transmission period contains at least two downlink symbols. Here, the radio network node replaces one downlink symbol of the at least two downlink symbols in the TDD structure with an extended guard period symbol. This means that the timing-advance offset is increased, which allows for improved isolation around the UL-to-DL switch. More precisely, the risk of "late" UE DL reception being interfered by another UE UL transmission is reduced, the risk of "early" UL reception being interfered by another radio network node's late transmission is reduced, the risk of a "late" radio network node interfering with another radio network node in UL is reduced, and the risk of "early" UE UL interference to another radio network node's UE still in DL is reduced.

Preferably, radio network node should also avoid to schedule traffic in last DL symbol before the DL-to-UL switch in order to create an additional timing margin at the switching point.

Further preferably, the radio network node offsets the uplink reception period to be initiated at a later position in the TDD structure, and extends a guard period interval before the uplink reception period in the TDD structure by an amount equal to the amount by which the uplink reception period is offset. Thereby, the risk of "late" interference by another early radio network node is mitigated. The risk of "early" DL reception by a UE being interfered by another late UE UL transmission is also mitigated. Further, the risk of "late" UE interference to another radio network node's UEs that are already being in DL reception. Additionally, the risk is mitigated that an "early" radio network node interferes with another radio network node still being in UL.

The offset, as such, may correspond to a duration of a fraction of a symbol in the TDD structure. Namely, this creates an improved granularity and allows for fine tuning. Specifically, it is preferable that each of the downlink symbols and each of the uplink symbols represents a regular symbol, and that said fraction of a symbol represents one or more short symbols.

According to another embodiment of this aspect of the invention, again the uplink reception period contains a single uplink symbol and the downlink transmission period contains at least two downlink symbols. Here, however, the radio network node extends a guard period interval after the uplink reception period in the TDD structure by an amount equal to a duration of a fraction of a symbol in the TDD structure. Further, the uplink reception period is offset to be initiated at a later position in the TDD structure, where the offset corresponds to the duration of said fraction of a symbol; and one downlink symbol of the at least two downlink symbols in the TDD structure is replaced with an extended guard period symbol. This decreases the timing advance offset, however increases the overall margin by removing the first downlink symbol before the switch.

According to another embodiment of this aspect of the invention, the downlink transmission period contains at least three downlink symbols and the uplink reception period contains a single uplink symbol. Here, the radio network node replace one downlink symbol of the at least three downlink symbols in the TDD structure with an extended guard period after the uplink reception period. The radio network node also offsets the uplink reception period to be initiated at a later position in the TDD structure, where the offset corresponds to a duration of a fraction of a symbol; and extends a guard period before the uplink reception period by an amount corresponding to the duration of said fraction of a symbol. Thus, the risk of a "late" UE DL reception being interfered by another UE UL transmission is mitigated; the risk of "early" UL reception being interfered by another radio network node's late DL transmission is mitigated; the risk of "late" radio network node interfering with another radio network node's UL reception is mitigated; and the risk of "early" UE UL interference to another radio network node's UE still being in DL is mitigated.

Preferably, the radio network node also extends the guard period further before the uplink reception period by replacing one downlink symbol of the at least three downlink symbols in the TDD structure with an extended guard period. Thereby, the risk of "early" UE DL reception being interfered by another UE UL transmitting late is reduced, as well as the risk of "early" radio network node interference towards another radio network node till being in UL reception.

According to another embodiment of this aspect of the invention, the uplink reception period contains at least two uplink symbols and the downlink transmission period contains at least three downlink symbols in the TDD structure.

Here, the radio network node replaces one downlink symbol of the at least three downlink symbols in the TDD structure after the uplink reception period with an extended guard period. The radio network node also offsets the uplink reception period to be initiated at a later position in the TDD structure, where the offset corresponds to a duration of a fraction of a symbol. A guard period before the uplink reception period is extended by an amount corresponding to the duration of said fraction of a symbol.

As a result, the risk of "late" UE DL reception being interfered by another UE's UL transmission is mitigated; the risk of "early" UL reception being interfered by another radio network node's late DL transmission is mitigated, the risk of "late" radio network node interference to another radio network node's UL reception is mitigated; and the risk of "early" UE UL interference to another radio network node's UE still in DL is mitigated.

Preferably, the radio network node also extends the guard period further before the uplink reception period by replacing one downlink symbol of the at least three downlink symbols in the TDD structure with an extended guard period. Hence, the risk of "late" UE interference to another radio network node's UE already in DL reception is reduced; the risk of "early" radio network node interference to other radio network nodes still in UL reception is reduced; and the risk of "early" UE DL reception being interfered by another UE's UL transmission is reduced.

According to yet another embodiment of this aspect of the invention the radio network node sends a coordination request to a central node in the radio communications network, which coordination request is configured to cause the central node to coordinate any increasing of the guard period with at least one additional radio network node being in communicative connection with the central node. Namely, thereby, the radio network nodes that need to adjust their TDD pattern to avoid interference issues can be instructed to do so in an efficient manner.

According to still another embodiment of this aspect of the invention the radio network node checks if the guard period has the extended duration; if so the radio network node further checks if none of the at least one synchronization degradation criterion is fulfilled. If so, i.e. if the synchronization is no longer degraded, the radio network node decreases the guard period to the regular duration. Consequently, whenever possible, the standard TDD pattern can be applied again.

According to another aspect of the invention, the above object is achieved by a method for a radio network node for use in a radio communications network using a TDD structure to communicate with UEs. The method involves receiving uplink data from the UEs and transmitting downlink data to the UEs. The method also involves applying such a TDD structure that, in each slot, there is at least one guard period between a downlink transmission period and an uplink reception period. The downlink transmission period containing at least one downlink symbol in which the radio network node may transmit data to a UE, and the uplink reception period contains at least one uplink symbol in which the radio network node may receive data from the UE. The method further involves checking whether at least one synchronization degradation criterion is fulfilled; and if so, the method also involves increasing the guard period to have an extended duration relative to a previous duration. In other words, the guard period is either extended from a regular duration to an extended duration, or from an already extended duration to have an even further extended duration.

The advantages of this method, as well as the preferred embodiments thereof, are apparent from the discussion above with reference to the proposed radio network node.

According to a further aspect of the invention the object is achieved by a computer program containing instructions which, when executed on at least one processor, cause the at least one processor to carry out the above-described method According to another aspect of the invention the object is achieved by a non-volatile data carrier containing such a computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings, on which:

FIG. 1 schematically shows two radio network nodes communicating with two user equipments using a prior-art TDD structure;

FIGS. 2*a-b* illustrate a TDD structure according to a first embodiment of the invention;

FIGS. 3*a-b* illustrate a TDD structure according to a second embodiment of the invention;

DETAILED DESCRIPTION

FIGS. 2*a* and 2*b* illustrate a TDD structure implemented by a radio network node in a radio communications network according to a first embodiment of the invention.

The radio network node applies such a TDD structure that between the downlink transmission period DP and the uplink reception period UP, at least one guard period $GP_1$ and $GP_2$ respectively is included in each slot S. Each of the one guard periods $GP_1$ and $GP_2$ represents an interval during which the radio network node does not transmit any data.

In 5G and NR, the slot S contains either 7 or 14 symbols. The duration of a symbol depends on the supported sub carrier spacing (SCS). For 15 kHz SCS the duration of a symbol is approximately 71 μs i.e. the same as in LTE. The symbol duration decreases to half for each doubling of the SCS.

In the example shown in FIG. 2*a*, the downlink transmission period DP contains five downlink symbols DL in which the radio network node may transmit data to a UE. The uplink reception period UP contains at least one uplink symbol UL in which the radio network node may receive data from the UE. In FIG. 2*a*, one uplink symbol UL is exemplified.

During operation, the radio network node repeatedly checks whether at least one synchronization degradation criterion is fulfilled. If this conditions is fulfilled, the radio network node increases the overall guard period to have an extended duration relative to the duration that the guard period had previously, for example a regular duration $GP_1$ and $GP_2$ respectively.

Figure 7:
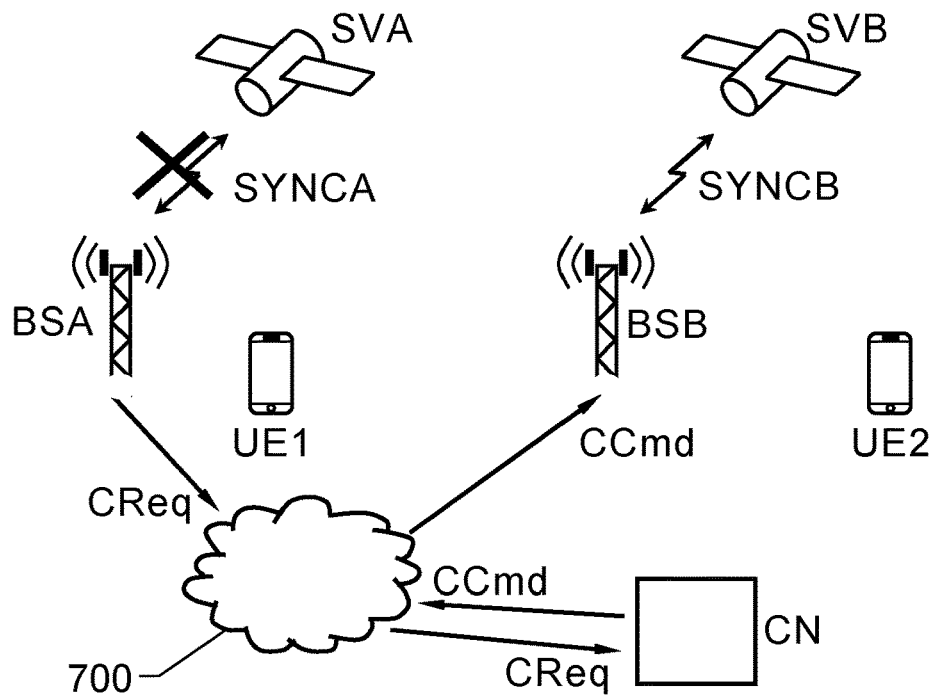
FIG. 7 schematically shows one embodiment of the invention wherein the TDD structures of two radio network nodes are coordinated with one another via a central node.

Referring now to FIG. 7, we see first and second radio network nodes BSA and BSB respectively, which receive first and second timing signals SYNCA and SYNCB from specified synchronization sources in the form of first and second GNSS satellites SVA and SVB respectively. A radio network node, say BSA, may determine that the at least one synchronization degradation criterion is fulfilled if the radio network node BSA does not receive the timing signal SYNCA from the specified synchronization source SVA.

Alternatively, the radio network node BSA may determine that the at least one synchronization degradation criterion is fulfilled if the radio network node BSA receives the timing signal SYNCA from the specified synchronization source SVA with a quality below a threshold value.

As another alternative, the radio network node BSA may determine that the at least one synchronization degradation criterion is fulfilled if the radio network node BSA experiences interference in its radio interface, which interference exceeds a threshold value.

As yet another alternative, the radio network node BSA may determine that the at least one synchronization degradation criterion is fulfilled if the radio network node BSA receives an interference report from a UE, say a first UE UE1 connected to the radio network node BSA; which interference report indicates that the first UE UE1 experiences interference above a threshold level.

Returning now to FIG. 2a, we see that the uplink reception period UP here contains a single uplink symbol UL. The downlink transmission period DP contains five downlink symbols DL. However, as a minimum, the downlink transmission period DP must contain at least two downlink symbols DL, i.e. resources in which data may be transmitted from the radio network node to a UE. According to one embodiment of the invention, the radio network node replaces one of the downlink symbols DL in the TDD structure with an extended guard period symbol eGP, at least before the switch to the uplink reception period UL. This is illustrated in FIG. 2b. Preferably, in connection with this, the radio network node also offsets the uplink reception period UP to be initiated at a later position in the TDD structure. This may be effected by reducing the duration of the guard period $GP_1'$ where the regular guard period $GP_1$ was located prior to the adjustment. The uplink reception period UP maintains its standard duration, and as a result, the guard period before the uplink reception period UP is somewhat prolonged from a regular duration $GP_2$ to an extended duration $GP_2'+GP_2$, thus providing an increased timing advance offset $TA_{offset}$. More precisely, the guard period interval before the uplink reception period UP in the TDD structure is extended by an amount equal to the amount by which the uplink reception period UP is offset. The offset preferably corresponds to a duration of a fraction of a symbol $GP_2'$ in the TDD structure.

FIGS. 3a and 3b illustrate a TDD structure according to another embodiment of the invention.

Analogous to the example of FIGS. 2a and 2b, the uplink reception period UP contains a single uplink symbol UL. However, of course, according to the invention, the uplink reception period UP may also contain larger numbers of uplink symbols UL. In any case, the downlink transmission period DP contains at least two downlink symbols DL, which here is exemplified by five downlink symbols DL.

The radio network node extends the guard period interval before the uplink reception period UP in the TDD structure by an amount equal to a duration of a fraction of a symbol $GP_1'$ in the TDD structure, i.e. less than the above extension eGP in FIG. 2b. The radio network node also offsets the uplink reception period UP to be initiated at an earlier position in the TDD structure. The offset corresponds to the duration of said fraction of a symbol $GP_1'$. Moreover, the radio network node replaces one downlink symbol DL in the TDD structure with an extended guard period symbol eGP immediately before the uplink reception period UP, thus accomplishing a substantial timing advance offset $TA_{offset}$.

Figure 4A:
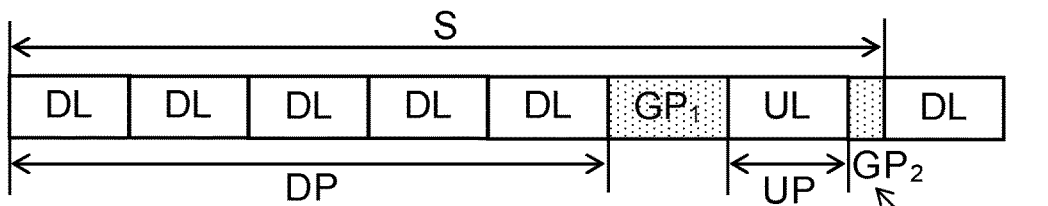
FIGS. 4*a-b* illustrate a TDD structure according to a third embodiment of the invention.
Figure 4B:
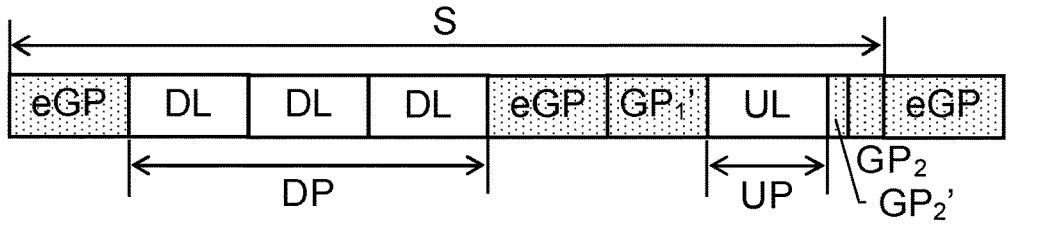

FIGS. 4a and 4b illustrate a TDD structure according to a further embodiment of the invention. Here, the downlink transmission period DP contains at least three downlink symbols DL, which in FIG. 4a is exemplified by five downlink symbols DL. The uplink reception period UP contains a single uplink symbol UL, although, of course, still within the scope of the invention, more uplink symbol UL may be included in the uplink reception period UP.

The radio network node replaces one of the downlink symbols DL in the TDD structure with an extended guard period eGP before the switch to the uplink reception period UP, and thus extends the overall guard period to $eGP+GP_1'$, where $GP_1'$ corresponds to a duration of a fraction of a symbol. Thereby, the radio network node offsets the uplink reception period UP to be initiated at a later position in the TDD structure. The radio network node also extends a guard period before the uplink reception period UP by an amount corresponding to the duration of said fraction of a symbol $GP_1'$.

Preferably, the radio network node further extends the guard period before the uplink reception period UP by also replacing one of the other downlink symbols DL in the TDD structure with an extended guard period eGP immediately before the uplink reception period UP, thus accomplishing a substantial timing advance offset $TA_{offset}$.

Figure 5A:
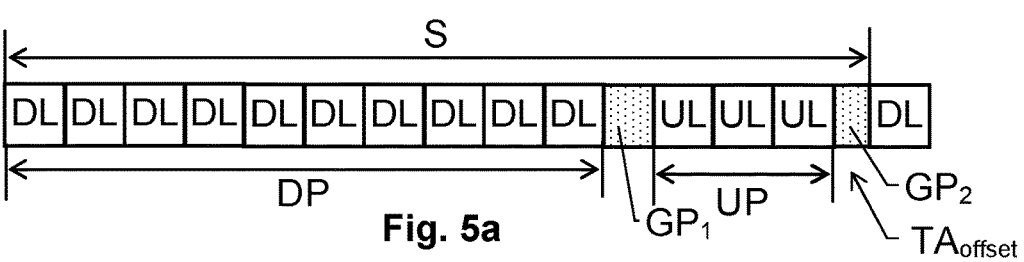
FIGS. 5*a-b* illustrate a TDD structure according to a fourth embodiment of the invention.
Figure 5B:
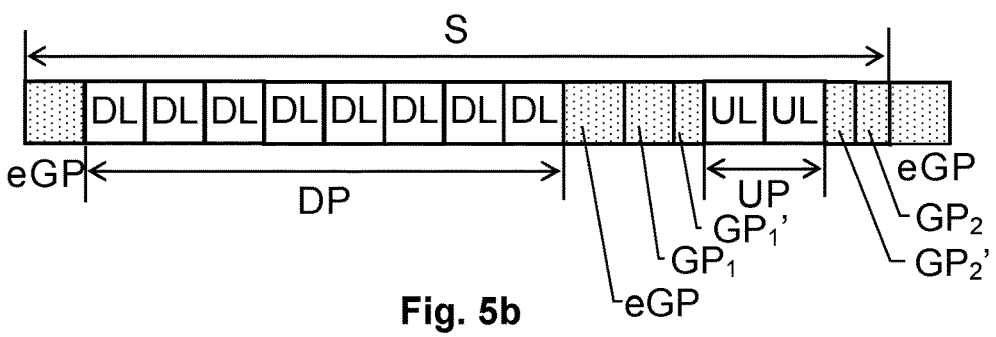

FIGS. 5a and 5b illustrate a TDD structure according to yet another embodiment of the invention.

The uplink reception period UP contains at least two uplink symbols UL, which here is exemplified by ten uplink symbols UL. The downlink transmission period DP contains at least three downlink symbols DL in the TDD structure.

To extend the overall guard period, the radio network node here replaces one of the downlink symbols DL in the TDD structure before the uplink reception period UP with an extended guard period eGP. The radio network node further offsets the uplink reception period UP to be initiated at an earlier position in the TDD structure. The offset corresponds to a duration of a fraction of a symbol $GP_1'$. The radio network node also extends a guard period before the uplink reception period UP by an amount corresponding to the duration of said fraction of a symbol $GP_2'$.

In addition thereto, the radio network node also preferably further extends the guard period before the uplink reception period UP by replacing one of the downlink symbols DL in the TDD structure with an extended guard period eGP.

Figure 6:
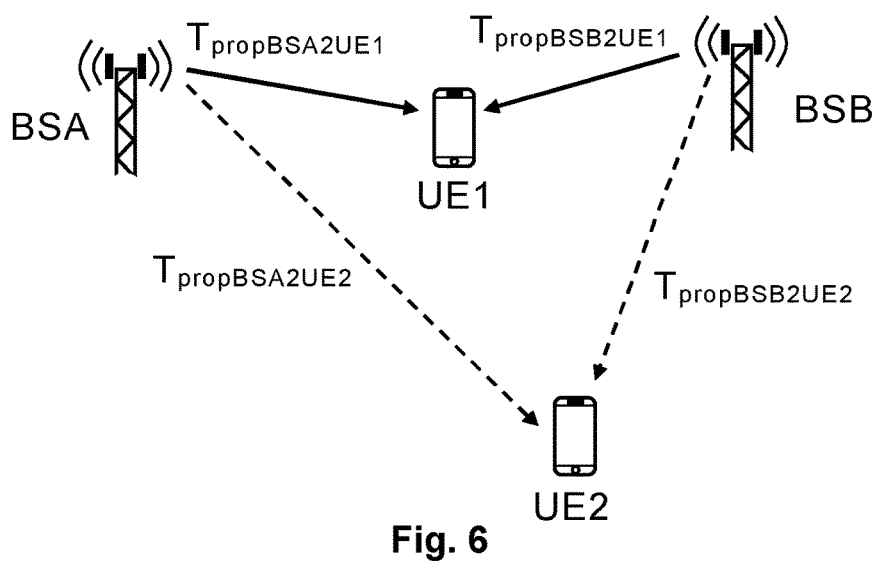
FIG. 6 illustrates different propagation delays to be handled in a scenario involving simultaneous communication with two radio network nodes.

FIG. 6 illustrates propagation delays necessary to handle in a scenario involving two radio network nodes (e.g. implementing a respective base station) transmitting to a UE and/or receiving from a UE when implementing coordinated services and functions, e.g. carrier aggregation (CA), coordinated multipoint (COMP), evolved multimedia broadcast multicast services (eMBMS) and/or enhanced inter-cell interference Coordination (eICIC). The coordinated services and functions generally requires "simultaneous" reception at the UE, or more precisely receiving data from two different radio network nodes with sufficiently small synchronization errors. In FIG. 6, this means that a first propagation delay $T_{propBSA2UE1}$ from a first radio network node BSA to a first UE UE1 shall be essentially the same as a second propagation delay $T_{propBSB2UE1}$ from a second radio network node BSB to the first UE UE1, where the first UE UE1 receives DL data from both the first and the second radio network node BSA and BSB respectively. Analogously, a third propagation delay $T_{propBSA2UE2}$ from the first radio network node BSA to a second UE UE2 shall be essentially the same as a fourth propagation delay $T_{propBSB2UE2}$ from the second radio network node BSB to the second UE UE2, where the second UE UE2 receives DL data from both the first and the second radio network node BSA and BSB respectively. If the first and second UEs UE1 and UE2 are located at very different distances from the radio network nodes BSA and BSB, this can be a challenging task that may require adjustment of the guard periods in the TDD pattern.

Returning now to FIG. 7, we will explain how the TDD structures of two (or more) radio network nodes BSA and BSB are coordinated with one another via a central node CN according to one embodiment of the invention. This coordination is preferably effected in an isolated area, e.g. indoor operating at mm-Wave carrier frequency with good indoor-outdoor isolation.

Either, the coordination is a static initial configuration, or it is a dynamic configuration, where one or more radio network nodes could initiate a request for a new guard period allocation caused by reduced synchronization performance (e.g. caused by GNSS jamming). The latter may be implemented as follows.

A radio network node, e.g. the first radio network node BSA, suffers from degraded synchronization because it does no longer receive the timing signal SYNCA from its specified synchronization source SVA at a required quality. Therefore, the first radio network node BSA needs to extend the guard periods in the TDD structure according to one of the above-described embodiments. In order to mitigate the risk of interference with the neighboring second radio network node BSB, the first radio network node BSA sends a coordination request CReq to a central node CN via a core network 700 of the radio communications network. The core network 700 may further be interfacing with a data network, such as the Internet, and with one or more servers, such as host computers operated by service providers or on their behalf.

The coordination request CReq is configured to cause the central node CN to coordinate the increasing of the guard period from a previous duration to an extended duration with at least one additional radio network node, here exemplified by the second radio network node BSB, being in communicative connection with the central node CN via the core network 700. Specifically, the coordination is accomplished by the central node CN sending a coordination command CCmd over the core network 700 to the second radio network node BSB. In response to the coordination command CCmd, the second radio network node BSB, in turn, is configured to adapt the TDD structure of the first radio network node BSA.

Figure 8:
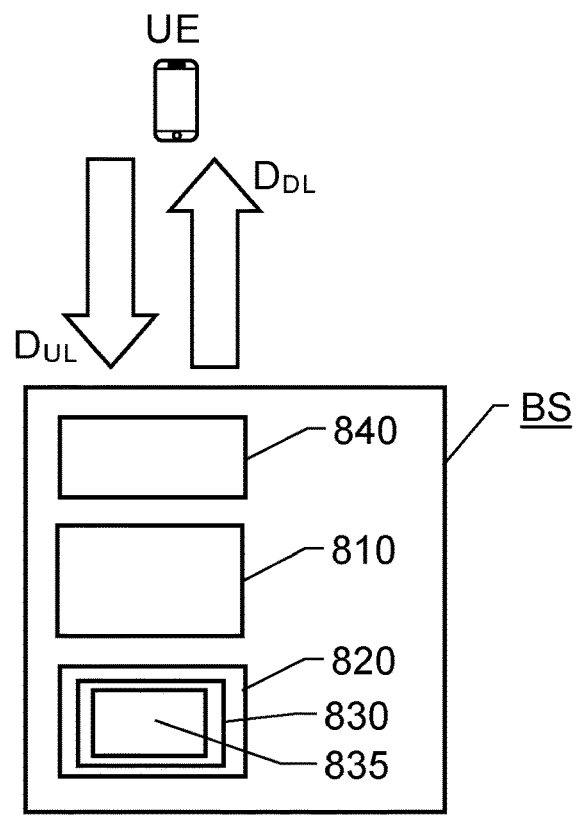
FIG. 8 shows a block diagram over a radio network node according to one embodiment of the invention.

FIG. 8 shows a block diagram of a radio network node BS according to one embodiment of the invention for use in a radio communications network using a TDD structure to communicate with UEs by receiving uplink symbols UL and transmitting downlink symbols DL. In addition to a radio interface 840, the radio network node BS includes a processor 810 and a memory 820. The memory 820, in turn, contains a computer program product 835 with instructions 835 executable by the processor 810, whereby the radio network node BS is operative to effect the above-described measures.

Figure 9:
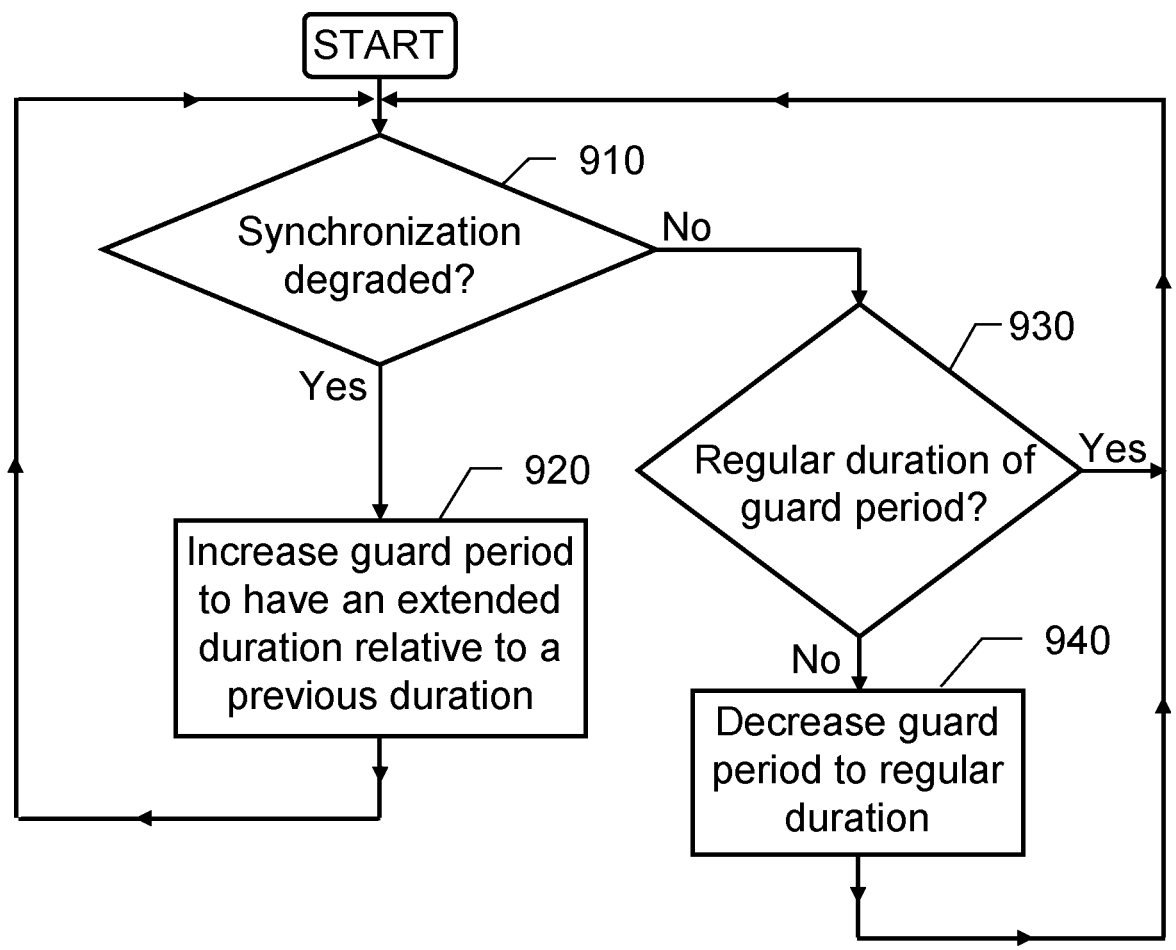
FIG. 9 illustrates, by means of a flow diagram, a method according to one embodiment of the invention.

In order to sum up, and with reference to the flow diagram in FIG. 9, we will now describe a method according to one embodiment of the invention for a radio network node for use in a radio communications network using a TDD structure to communicate with UEs, and where the radio network node applies such a TDD structure that at least one guard period is included in each slot between a downlink transmission period and an uplink reception period.

In a first step 910, it is checked whether at least one synchronization degradation criterion is fulfilled. In other words step 910 investigates whether the synchronization has been deteriorated to a certain extent, for example due to loss of a timing signal, jamming and/or interference. If the synchronization is found to be acceptable, the procedure continues to a step 930, and otherwise a step 920 follows. In step 920, the guard period is increased to have an extended duration relative to a regular duration. I.e. in step 920, the guard period is either increased from a regular duration to an extended duration, or from an already extended duration to an even further extended duration.

In step 930, is checked if the guard period has a regular duration; and if so, the procedure loops back to step 910. Otherwise, a step 940 follows, in which the guard period is decreased to the regular duration. Namely, if there is no degradation of the synchronization (i.e. if it is found that an acceptable synchronization has been regained), the regular guard period provides a better throughput and reduced latency. After step 930, the procedure loops back to step 910.

All of the process steps, as well as any sub-sequence of steps, described with reference to FIG. 9 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A radio network node for use in a radio communications network using a time division duplex, TDD, structure to communicate with user equipments, UEs, the radio network node comprising:
a radio interface configured to receive uplink data from the UEs, and transmit downlink data to the UEs;
a processor and;
a memory containing instructions executable by the processor to configure the radio network node to:
apply a TDD structure comprising at least one guard period in each slot between a downlink transmission period and an uplink reception period, the downlink transmission period comprising at least two downlink symbols in which the radio network node may transmit data to a UE, the uplink reception period comprising a single uplink symbol in which the radio network node may receive data from the UE;
increase the guard period from a previous duration to an extended duration relative to the previous duration if at least one synchronization degradation criterion is fulfilled;
extend the guard period interval before the uplink symbol period in the TDD structure by an amount equal to a duration of a fraction of a symbol in the TDD structure;
offset the uplink reception period to be initiated at an earlier position in the TDD structure, the offset corresponding to the duration of the fraction of a symbol; and
replace one downlink symbol of the at least two downlink symbols in the TDD structure with an extended guard period symbol.

2. The radio network node according to claim 1, wherein the instructions executable by the processor are further configured to render the radio network node operative to determine that the at least one synchronization degradation criterion is fulfilled if one of:
the radio network node does not receive a timing signal from a specified synchronization source;
the radio network node receives the timing signal from the specified synchronization source with a quality below a threshold value;
the radio network node experiences interference above a threshold level; and
the radio network node receives an interference report from a UE, which interference report indicates an experienced interference above the threshold level.

3. The radio network node according to claim 1, wherein the instructions executable by the processor further configure the radio network node to:
replace one downlink symbol of the at least two downlink symbols in the TDD structure with an extended guard period symbol.

4. The radio network node according to claim 3, wherein the instructions executable by the processor further configure the radio network node to:
offset the uplink reception period to be initiated at a later position in the TDD structure; and
extend a guard period interval before the uplink reception period in the TDD structure by an amount equal to the amount by which the uplink reception period is offset.

5. The radio network node according to claim 4, wherein the offset corresponds to a duration of a fraction of a symbol in the TDD structure.

6. The radio network node according to claim 5, wherein each of the downlink symbols and each of the uplink symbols represents a regular symbol, and the fraction of a symbol represents at least one short symbol.

7. The radio network node according to claim 1, wherein the downlink transmission period comprises at least three downlink symbols, and the instructions executable by the processor further configure the radio network node to:
replace one downlink symbol of the at least three downlink symbols in the TDD structure with an extended guard period before the uplink reception period;
offset the uplink reception period to be initiated at a later position in the TDD structure, the offset corresponding to a duration of a fraction of a symbol; and
extend a guard period before the uplink reception period by an amount corresponding to the duration of said fraction of a symbol.

8. The radio network node according to claim 7, wherein the instructions executable by the processor further configure the radio network node to:
further extend the guard period before the uplink reception period by replacing one downlink symbol of the at least three downlink symbols in the TDD structure with an extended guard period.

9. The radio network node according to claim 1, wherein the uplink reception period comprises at least two uplink symbols, the downlink transmission period comprises at least three downlink symbols in the TDD structure, and the instructions executable by the processor further configure the radio network node to:
replace one downlink symbol of the at least three downlink symbols in the TDD structure before the uplink reception period with an extended guard period;
offset the uplink reception period to be initiated at an earlier position in the TDD structure, the offset corresponding to a duration of a fraction of a symbol; and
extend a guard period before the uplink reception period by an amount corresponding to the duration of said fraction of a symbol.

10. The radio network node according to claim 9, wherein the instructions executable by the processor further configure the radio network node to:
further extend the guard period before the uplink reception period by replacing one downlink symbol of the at least three downlink symbols in the TDD structure with an extended guard period.

11. The radio network node according to claim 1, wherein the instructions executable by the further configure the radio network node to:
send a coordination request to a central node in the radio communications network, the coordination request being configured to cause the central node to coordinate the increasing of the guard period from the previous duration with at least one additional radio network node being in communicative connection with the central node.

12. The radio network node according to claim 1, wherein the instructions executable by the processor further configure the radio network node to:

check whether the guard period has an extended duration relative to a regular duration; and if so:
check whether none of the at least one synchronization degradation criterion is fulfilled; and
if none of the at least one synchronization degradation criterion is fulfilled:
decrease the guard period to the regular duration.

13. A method for a radio network node for use in a radio communications network using a time division duplex, TDD, structure to communicate with user equipments, UEs, the method comprising:
receiving uplink data from the UEs;
transmitting downlink data to the UEs;
including at least one guard period in each slot of the TDD structure between a downlink transmission period and an uplink reception period, the downlink transmission period comprising at least two downlink symbols in which the radio network node may transmit data to a UE, the uplink reception period comprising a single uplink symbol in which the radio network node may receive data from the UE;
checking whether at least one synchronization degradation criterion is fulfilled and, if at least one of the at least one synchronization degradation criterion is fulfilled, increasing the guard period from a previous duration to have an extended duration relative to the previous duration;
extending a guard period interval before the uplink reception period in the TDD structure by an amount equal to a duration of a fraction of a symbol in the TDD structure;
offsetting the uplink reception period to be initiated at an earlier position in the TDD structure, the offset corresponding to the duration of said fraction of a symbol; and
replacing one downlink symbol of the at least two downlink symbols in the TDD structure with an extended guard period symbol.

14. The method according to claim 13, wherein the at least one synchronization degradation criterion is fulfilled if one of:
the radio network node does not receive a timing signal from a specified synchronization source;
the radio network node receives the timing signal from the specified synchronization source with a quality below a threshold value;
the radio network node experiences interference above a threshold level; and
the radio network node receives an interference report from a UE, which interference report indicates an experienced interference above the threshold level.

15. The method according to claim 13, the method further comprising:
replacing one downlink symbol of the at least two downlink symbols slots in the TDD structure with an extended guard period symbol.

16. The method according to claim 15, further comprising:
offsetting the uplink reception period to be initiated at a later position in the TDD structure; and
extending a guard period interval before the uplink reception period in the TDD structure by an amount equal to the amount by which the uplink reception period is offset.

17. The method according to claim 16, wherein the offset corresponds to a duration of a fraction of a symbol in the TDD structure.

18. The method according to claim 17, wherein each of the downlink symbol and each of the uplink symbol represents a regular symbol, and the fraction of a symbol represents at least one short symbol.

19. The method according to claim 13, wherein the downlink transmission period comprises at least three downlink symbols, and method further comprising:
replacing one downlink symbol of the at least three downlink symbols in the TDD structure with an extended guard period before the uplink reception period;
offsetting the uplink reception period to be initiated at a later position in the TDD structure, the offset corresponding to a duration of a fraction of a symbol; and
extending a guard period before the uplink reception period by an amount corresponding to the duration of said fraction of a symbol.

20. The method according to claim 19, comprising:
extending the guard period further before the uplink reception period by replacing one downlink symbol of the at least three downlink symbols in the TDD structure with an extended guard period.

21. The method according to claim 13, wherein the uplink reception period comprises at least two uplink symbols, the downlink transmission period comprises at least three downlink symbols in the TDD structure, and the method further comprises:
replacing one downlink symbol of the at least three downlink symbols in the TDD structure before the uplink reception period with an extended guard period;
offsetting the uplink reception period to be initiated at an earlier position in the TDD structure, the offset corresponding to a duration of a fraction of a symbol; and
extending a guard period before the uplink reception period by an amount corresponding to the duration of said fraction of a symbol.

22. The method according to claim 21, further comprising:
extending the guard period further before the uplink reception period by replacing one downlink symbol of the at least three downlink symbols in the TDD structure with an extended guard period.

23. The method according to claim 13, further comprising:
sending a coordination request from the radio network node to a central node in the radio communications network, the coordination request being configured to cause the central node to coordinate the increasing of the guard period from the regular duration to the extended duration with at least one additional radio network node (BSB) being in communicative connection with the central node.

24. The method according to claim 13, further comprising:
checking whether none of the at least one synchronization degradation criterion is fulfilled; and
if none of the at least one synchronization degradation criterion is fulfilled:
decreasing the guard period to the regular duration.

* * * * *